United States Patent
Shino et al.

[19]

[11] Patent Number: 5,960,773
[45] Date of Patent: Oct. 5, 1999

[54] ENGINE CONTROL APPARATUS

[75] Inventors: Toshikazu Shino, Chigasaki; Kimiyoshi Nishizawa, Yokohama, both of Japan

[73] Assignee: Nissan Motor Co., Ltd., Kanagawa, Japan

[21] Appl. No.: 08/726,295

[22] Filed: Oct. 2, 1996

[30] Foreign Application Priority Data

Oct. 2, 1995 [JP] Japan ................................. 7-255258

[51] Int. Cl.⁶ .......................... F02D 41/06; F02D 41/14; F02P 5/15
[52] U.S. Cl. .................. 123/406.47; 123/680; 123/683; 123/686; 123/687
[58] Field of Search ..................................... 123/680, 681, 123/683, 687, 688, 689, 686, 406.45, 406.46, 406.47; 60/276, 285, 284

[56] References Cited

U.S. PATENT DOCUMENTS

| | | | |
|---|---|---|---|
| 4,445,482 | 5/1984 | Hasegawa et al. | 123/679 |
| 4,528,956 | 7/1985 | Ogata et al. | 123/687 X |
| 4,576,134 | 3/1986 | Yamato et al. | 123/480 |
| 4,926,828 | 5/1990 | Fujimoto et al. | 123/677 |
| 5,211,011 | 5/1993 | Nishikawa et al. | 60/284 |
| 5,383,432 | 1/1995 | Cullen et al. | 123/406 |
| 5,483,946 | 1/1996 | Hamburg et al. | 123/680 X |
| 5,685,283 | 11/1997 | Nishioka et al. | 123/680 |

FOREIGN PATENT DOCUMENTS 5-272394  10/1993  Japan .

Primary Examiner—Tony M. Argenbright
Attorney, Agent, or Firm—McDermott, Will & Emery

[57] ABSTRACT

When feedback control of air/fuel ratio is not being performed in an engine and the engine is idling, the fuel supply amount is increased according to the engine coolant temperature. When feedback control of air/fuel ratio is not being performed and the engine is not idling, the fuel supply amount is decreased according to the engine coolant temperature. Due to this decrease correction, during the time period from when idling operation is terminated directly after starting the engine to when the feedback control of the air/fuel ratio is started, the air/fuel ratio is made lean at an early stage, and the oxygen concentration in the engine exhaust gas is increased, so that the conversion of HC by the catalyst is quickly started.

8 Claims, 7 Drawing Sheets

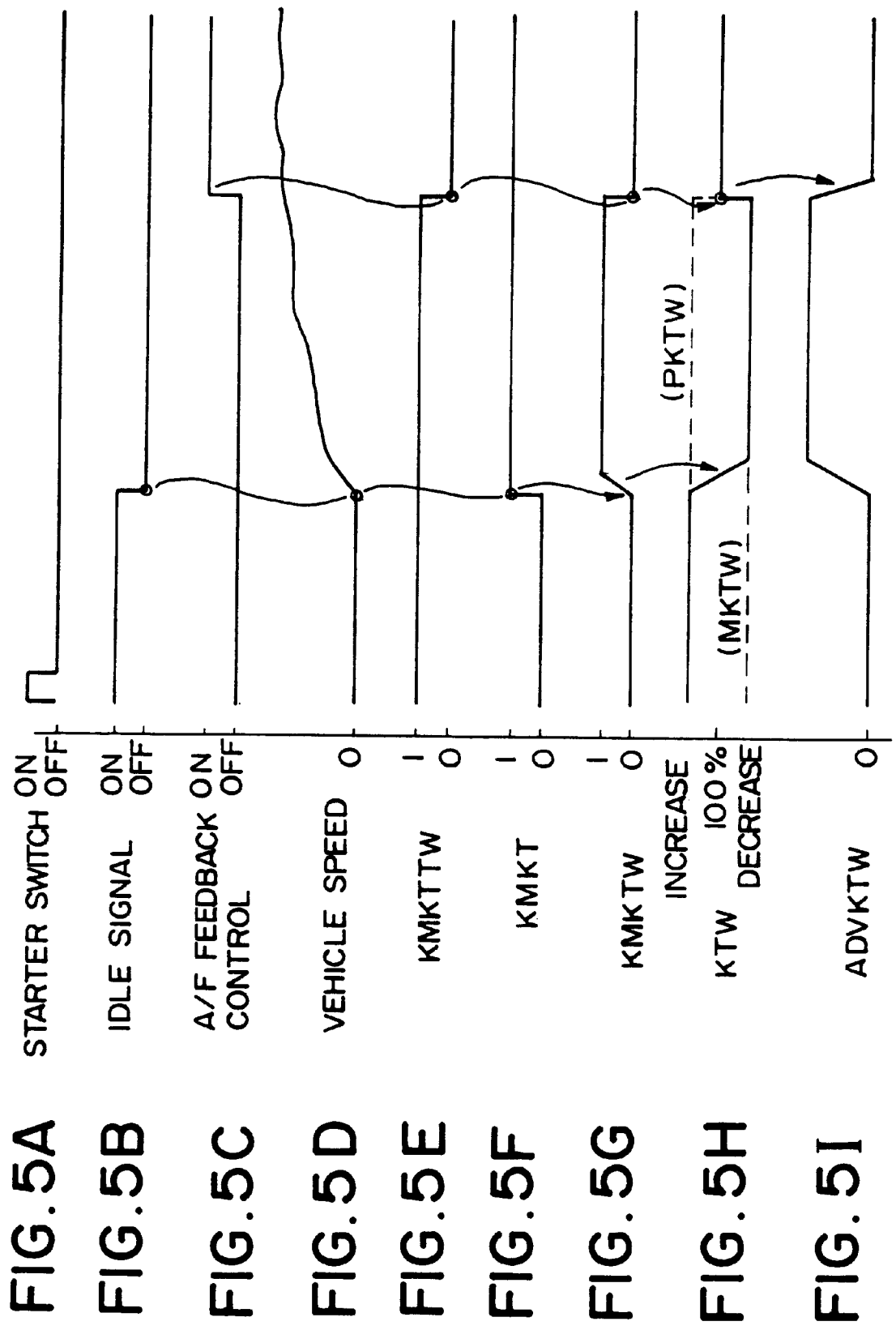

ENGINE CONTROL APPARATUS

FIELD OF THE INVENTION

This invention relates to control of ignition timing and of air/fuel ratio for an engine.

BACKGROUND OF THE INVENTION

With an exhaust gas purification system in which a catalytic converter employing a three way catalyst is provided to an exhaust conduit of an engine, the conversion efficiencies for HC, CO, and NOx are all highest when the air/fuel ratio of the fuel mixture in the engine is the stoichiometric air/fuel ratio.

For this reason it is widely practiced to provide an oxygen sensor which detects the oxygen concentration in the engine exhaust, and to perform quick response feedback control of the fuel supply amount to the engine based upon this oxygen concentration, so as to maintain the air/fuel ratio of the fuel mixture in the vicinity of the stoichiometric air/fuel ratio.

In this case the air/fuel ratio feedback control is only performed after the oxygen sensor has been activated, since the air/fuel ratio cannot be accurately detected during the time period from when the engine is started to when the oxygen sensor is activated. Further, it is not possible to attain proper conversion efficiency if the three way catalyst has not yet attained its activation temperature. Accordingly, it is difficult to obtain a desirable exhaust gas purification performance from the three way catalyst in the state when the engine is cold.

In order to cope with this problem, it has been disclosed in Tokkai Hei 5-272394 published by the Japanese Patent Office in 1993 to ensure the operational performance of the engine in the state when the engine is cold before the start of air/fuel ratio feedback control by increase correcting the amount of fuel supplied to the engine, and to speed up the activation of the catalyst by delay correcting the timing of ignition of the fuel mixture in the engine.

However with this method, even when the catalyst has arrived at its activation temperature, since the concentration of oxygen is low due to the fuel amount increase correction, the process of oxidation of HC becomes difficult, and it is not possible to obtain a sufficient result in terms of catalyst activation.

SUMMARY OF THE INVENTION

It is therefore an object of this invention to promote the oxidation of HC directly after catalyst activation from the state when the engine is cold.

In order to achieve the above object, this invention provides a control apparatus for an engine which has a catalytic converter for purifying exhaust gas of the engine, a mechanism for detecting an air/fuel ratio of a fuel mixture in the engine and a mechanism for feedback controlling a fuel supply amount to the engine so as to maintain the air/fuel ratio in the vicinity of a target value. The apparatus comprises a mechanism for detecting a temperature of the engine, a mechanism for detecting an operation state of the engine, a mechanism for increasing the fuel supply amount for an increase value, a mechanism for decreasing the fuel supply amount for a decreasing value, a mechanism for determining whether or not the feedback control is being performed, and a mechanism for selectively applying the increasing mechanism and decreasing mechanism according to the operation state of the engine in the state in which the feedback control is not being performed.

The apparatus is specifically suited for the engine with the catalytic converter comprising a three-way catalyst or an oxidizing catalyst.

It is preferable that the operation state detecting mechanism comprises a mechanism for detecting an idling operation state of the engine and the applying mechanism applies the increasing mechanism when the engine is in the idling operation state and the decreasing mechanism when the engine is in the non-idling operation state.

It is also preferable that the applying mechanism further comprises a mechanism for gradually changing the fuel supply amount when the increasing mechanism and decreasing mechanism are alternatively applied. In this case it is further preferable that the applying mechanism applies a correction value KTW for correcting the fuel supply amount which is determined by the following relation:

$$KTW = PKTW - (PKTW - MKTW) \cdot KMKTW$$

where, PKTW is the increase value,
MKTW is the decrease value, and
KMKTW is a correction factor which is gradually changes between 0 and 1.

It is further preferable that the apparatus further comprises a mechanism for advancing an ignition timing of the fuel mixture in the engine when the applying mechanism is applying the decreasing mechanism. This advancing mechanism increases an advance amount of the ignition timing as (PKTW−MKTW) increases.

It is also preferable that the operation state detecting mechanism comprises a mechanism for detecting at least one of an engine load, an engine revolution speed, and a throttle opening amount, and decreasing mechanism modifies the decrease value based upon at least one of the engine load, the engine revolution speed, and the throttle opening amount.

It is also preferable that the apparatus further comprises a mechanism for advancing an ignition timing of the fuel mixture in the engine when the applying mechanism is applying the decreasing mechanism. Preferably, the advancing mechanism gradually increases an advance amount of the ignition timing from a time point at which the applying mechanism applies the decreasing mechanism, and gradually decreases the advance amount from a time point at which the applying mechanism ceases to apply the decreasing mechanism.

The details as well as other features and advantages of this invention are set forth in the remainder of the specification and are shown in the accompanying drawings.

BRIEF DESCRIPTION OF THE DRAWINGS

FIGS. 5A through 5I are timing charts showing characteristics of various parameters related to the operation of the control apparatus.

DESCRIPTION OF THE PREFERRED EMBODIMENTS

Figure 1:
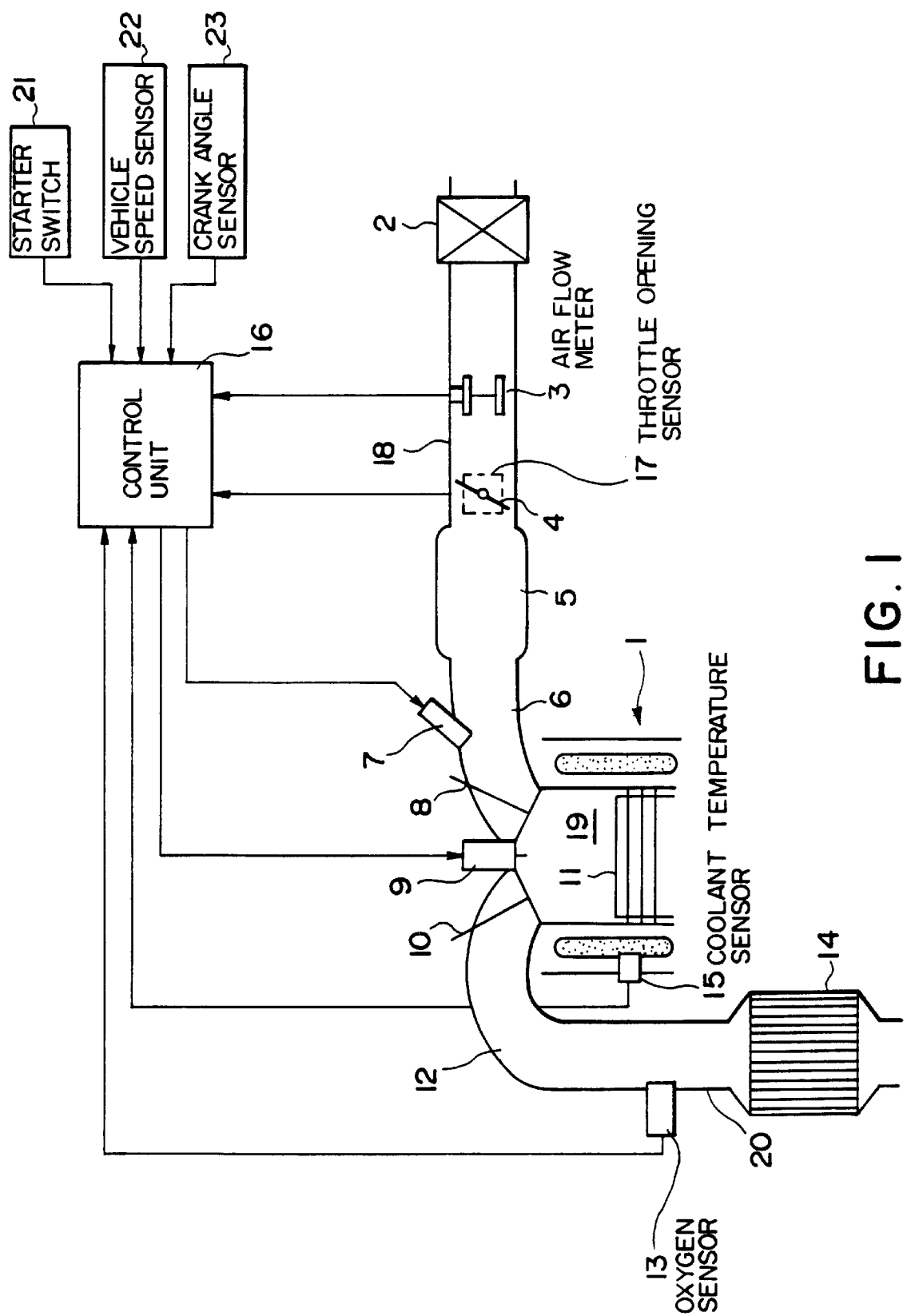
FIG. 1 is a schematic diagram of an engine control apparatus according to this invention.

Referring to FIG. 1 of the drawings, air filtered by an air cleaner 2 is inhaled into a liquid cooled type multi cylinder engine 1 for an automobile via a collector 5 and an intake manifold 6.

The amount of intake air is regulated by a throttle 4 which is provided in an intake conduit 18 which joins the air cleaner 2 to the collector 5. A throttle opening sensor 17 is fitted to the throttle 4 and detects the throttle opening angle thereof. Further, an air flow meter 3 is provided in the intake conduit 18 in order to measure the amount of intake air.

An separate injector 7 is provided in the intake manifold 6 for each cylinder of the engine. Fuel which is injected from the injector 7 is mixed with intake air in the intake manifold 6, and is inhaled past an intake valve 8 into a combustion chamber which is defined within a cylinder 19 by a piston 11. The fuel mixture is ignited by a spark plug 9 in the combustion chamber, and its expansion powers the engine 1.

The gas resulting from combustion within the combustion chamber is expelled therefrom past an exhaust valve 10 and through an exhaust port 12 and is led to a catalytic converter 14 which is provided part way along an exhaust conduit 20. This catalytic converter 14 performs oxidizing and reducing action by the operation of an internally contained three way catalyst, and thereby converts CO, HC, and NOx in the exhaust gas into non harmful components which are then exhausted to the atmosphere. The efficiency of the three way catalyst for conversion of CO, HC, and NOx is at its highest in the state when the air/fuel ratio of the fuel mixture in the engine 1 is maintained in the vicinity of the stoichiometric air/fuel ratio.

An oxygen sensor 13 is provided in the exhaust port 12. This oxygen sensor 13 is a sensor which detects the concentration of oxygen in the exhaust gas and varies its output signal in accordance therewith, and in concrete terms is an battery type oxygen concentration sensor which generates a voltage output which corresponds to the ratio between the oxygen concentration in the exhaust gas and the oxygen concentration in the atmosphere (taken as a reference).

The fuel injection amount for the injector 7 and the ignition timing for the fuel mixture by the spark plug 9 are controlled by a control unit 16.

For this control, the signals from the air flow meter 3, the oxygen sensor 13, the throttle opening sensor 17, and from a coolant temperature sensor 15 which detects the temperature of the coolant of the engine 1 are input to the control unit 16. Further, the signals from a per se known starter switch 21 which operates a starter not shown in the figures in order to start the engine, from a vehicle speed sensor 22 which detects the speed of movement of the vehicle, and from a crank angle sensor 23 which detects the revolution speed of the engine 1, are also input to the control unit 16.

The control unit 16 controls the fuel injection amount for the injector 7 and the ignition timing for the spark plug 9 based upon these input signals by executing programs whose flow charts are shown in FIGS. 2, 3, and 4A and 4B.

Figure 2:
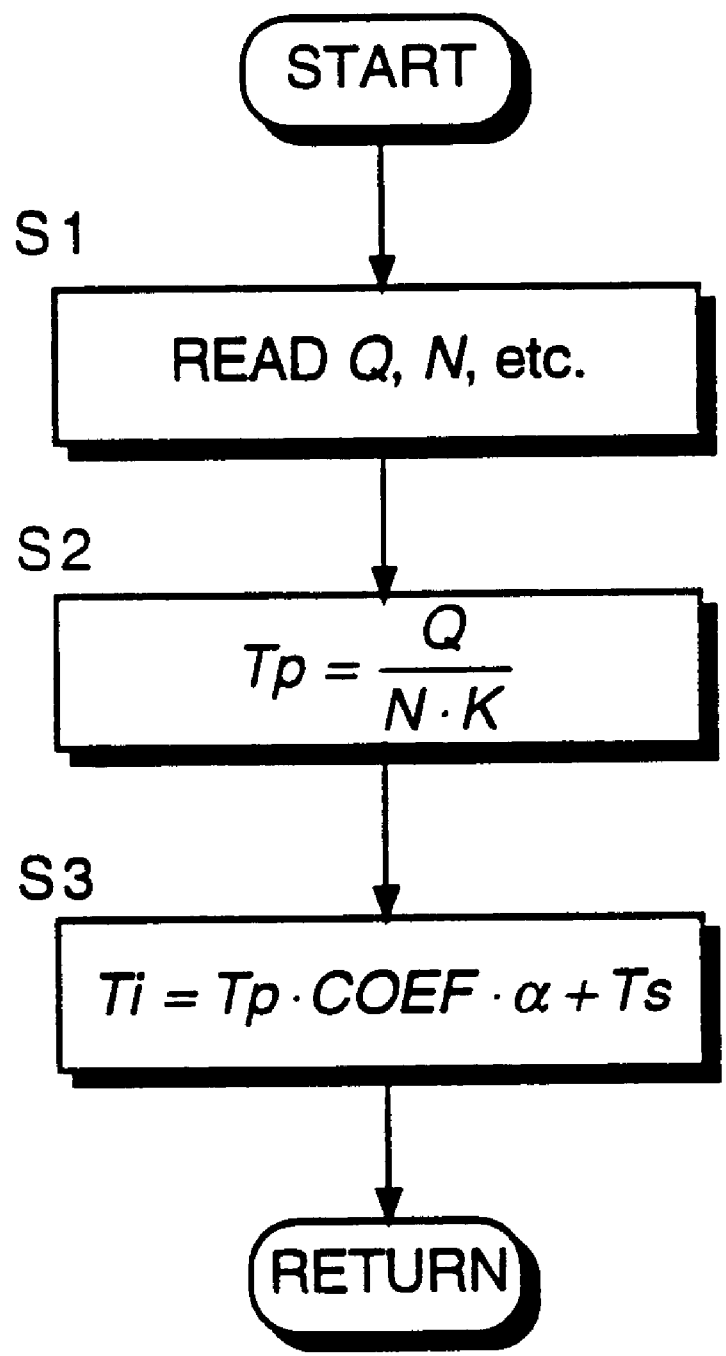
FIG. 2 is a flow chart for explanation of a process for calculating a fuel injection amount, performed by the engine control apparatus.

The calculation of the fuel injection amount Ti for the injector 7 is performed according to the flow chart shown in FIG. 2.

First in a step S1 data is read in, such as the intake air amount Q detected by the air flow meter 3, the engine revolution speed N detected by the crank angle sensor 23, and the like.

In a step S2, a basic fuel injection amount Tp is calculated according to the following equation:

$$Tp = \frac{Q}{N \cdot K}$$

where, K is a constant.

In a step S3, the fuel injection amount Ti is calculated according to the following equation:

$$Ti = Tp \cdot COEF \cdot \alpha + Ts$$

Here, Tp is the value calculated in the step S2. COEF represents various correction coefficients including a coolant temperature correction coefficient KTW which will be described hereinafter, and may be described by the equation COEF=1.0+KTW+... The symbol a represents an air/fuel ratio feedback correction coefficient, while Ts is a correction amount for invalid injection time caused by the voltage of the battery.

Figure 3:
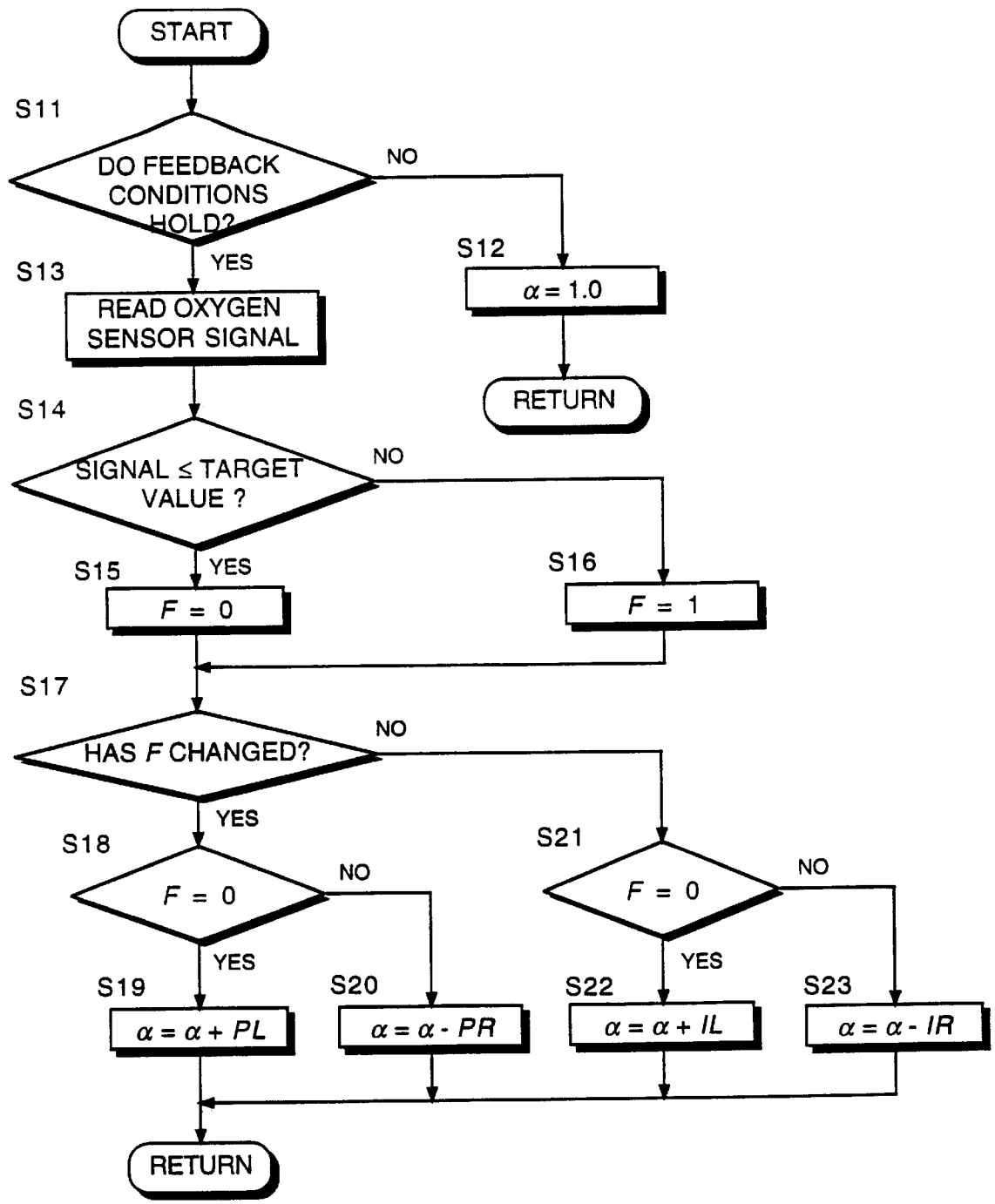
FIG. 3 is a flow chart for explanation of a process for setting an air/fuel ratio feedback correction coefficient a, performed by the engine control apparatus.
Figure 4A:
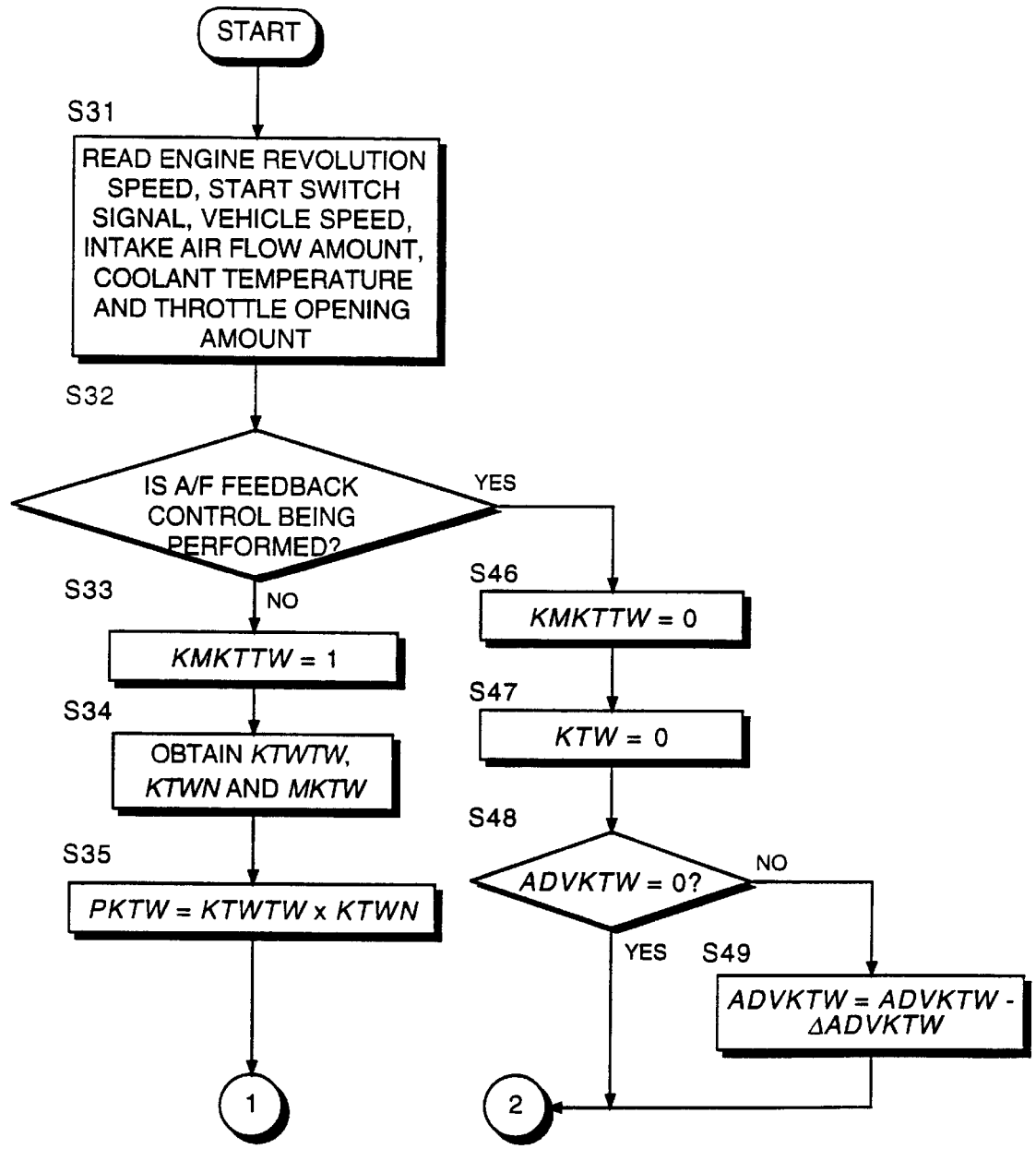
FIGS. 4A and 4B are flow charts for explanation of a process for correcting the fuel injection amount according to coolant temperature, performed by the engine control apparatus.
Figure 4B:
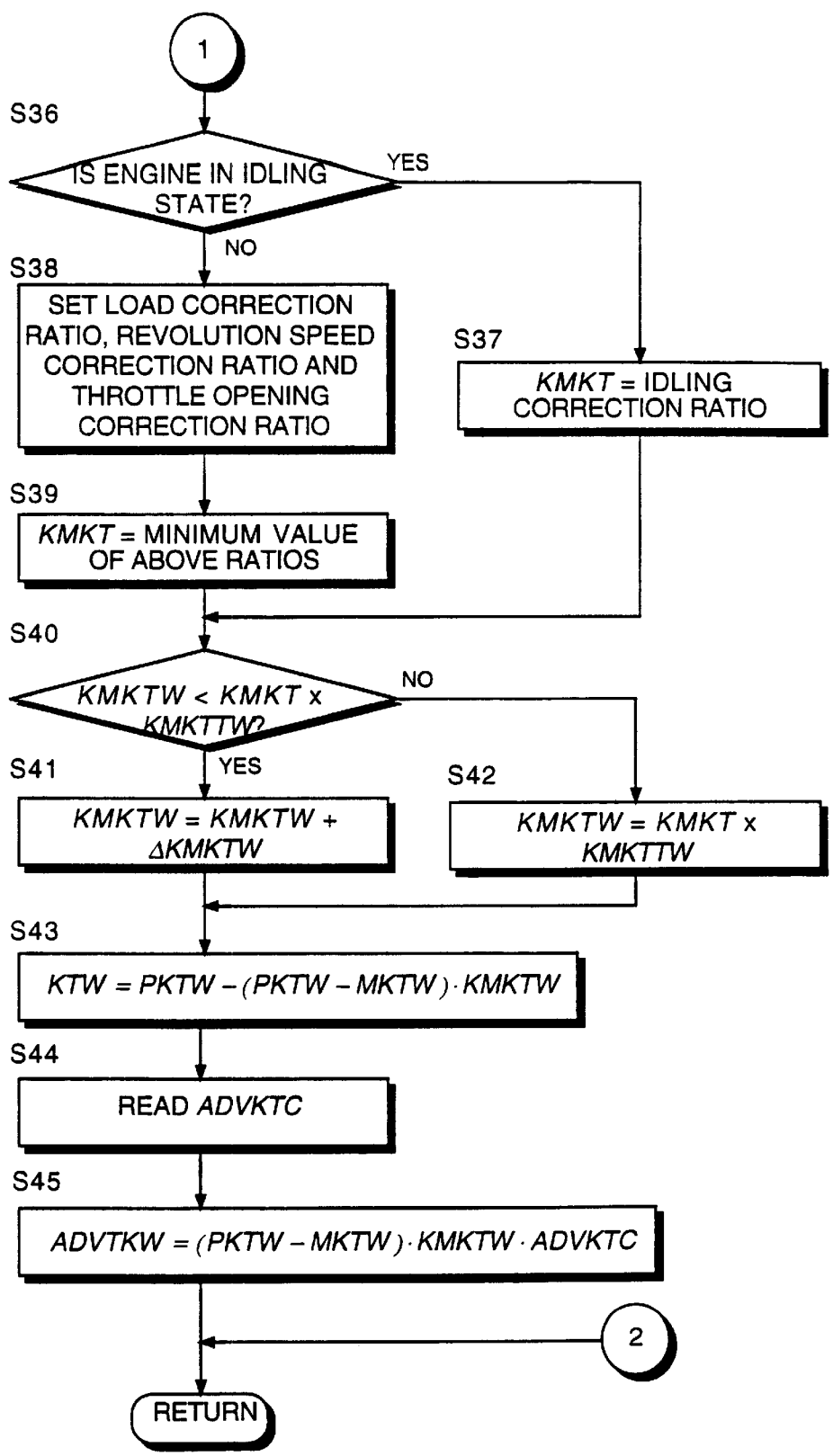

The setting of the air/fuel ratio feedback correction coefficient $\alpha$ is performed according to the flow chart shown in FIG. 3.

In this process, first in a step S11 a decision is made as to whether or not various conditions for performing feedback control of the air/fuel ratio currently are satisfied. In detail, since feedback control of the air/fuel ratio is not suitable when the engine is being started, when the temperature of the coolant is low, when the engine is operating at high load, during engine idling, during vehicle deceleration, when an abnormality has occurred with the oxygen sensor, etc., a check is performed so as to ensure that none of these conditions is currently the case.

If any of the above described conditions holds, then the conditions for feedback control are not satisfied. In this case, in a step S12 the air/fuel ratio feedback correction coefficient $\alpha$ is set to an initial value of 1.0, and then the operation of this routine terminates.

If none of the above described conditions holds, then it is deemed that the conditions for air/fuel ratio feedback control are satisfied, and the flow of control proceeds to a step S13, in which the output signal from the oxygen sensor 13 is read in.

Next in a step S14 the output signal from the sensor and a value corresponding to the stoichiometric air/fuel ratio (which is the target air/fuel ratio) are compared together, and it is decided whether or not the actual air/fuel ratio is rich or lean as compared to the target air/fuel ratio. If the output signal from the sensor is smaller than a predetermined value which corresponds to the stoichiometric air/fuel ratio then a conclusion of "lean" is reached, while if this output signal is greater than the predetermined value then a conclusion of "rich" is reached.

In the case of "lean" then the flow of control proceeds to a step S15, in which a flag F which shows whether the current air/fuel ratio is rich or is lean is set to 0. On the other hand, in the case of "rich", in a step S16 the flag F is set to 1.

In a step S17, it is determined whether or not the value of the flag F has changed. In order to perform this determination, the value of the flag F the previous time this process was executed has been stored in a memory, and by comparing the value of the flag F just set in the step S15 or the step S16 with the value stored in the memory, it is determined whether or not the value of the flag F the has changed.

If the flag F has changed, then this shows that the actual air/fuel ratio has changed beyond the stoichiometric air/fuel ratio. In this case, in a step S18 a decision is made as to whether or not the current value of the flag F is 0, in other words as to whether or not the air/fuel ratio has changed from rich to lean. If the current value of the flag F is 1, then by contrast this means that the air/fuel ratio has changed from lean to rich.

If the air/fuel ratio has changed from rich to lean, then in a step S19 a proportional correction amount PL is added to the feedback correction coefficient α, and thereby the new correction coefficient α=α+PL is set. On the other hand, if the air/fuel ratio has changed from lean to rich, then in a step S20 another proportional correction amount PR is subtracted from the feedback correction coefficient α, and thereby the new correction coefficient α=α−PR is set.

If the result of the decision in the step S17 is that the value of the flag F has not changed, then in a step S21 a decision is made as to whether or not the current value of the flag F is 0.

If in this step S21 the current value of the flag F is 0, then this means that a lean air/fuel ratio is continuing. In this case, in a step S22 an integral correction amount IL is added to the feedback correction coefficient α, and thereby the new correction coefficient α=α+IL is set.

On the other hand, if in the step S21 the current value of the flag F is 1, then this means that a lean air/fuel ratio is continuing. In this case, in a step S23 another integral correction amount IR is subtracted from the feedback correction coefficient α, and thereby the new correction coefficient α=α−IR is set. It should be noted that all of these correction values PL, PR, IL, and IR are positive values. The air/fuel ratio feedback correction coefficient α which is set in this manner is used in the calculation of the fuel injection amount Ti described above.

Further, as mentioned earlier, a coolant temperature correction coefficient KTW is included in the COEF used in the calculation of the fuel injection amount Ti. The setting of this coolant temperature correction coefficient KTW is performed according to the flow charts shown in FIGS. 4A and 4B.

First, in a step S31, the engine revolution speed, the starter switch signal, the vehicle speed, the intake air flow amount, the coolant temperature, and the throttle opening amount are read in from the outputs of the various sensors described above.

In a step S32, it is determined whether or not the air/fuel ratio feedback control is being performed.

If air/fuel ratio feedback control is not performed, the flow of control proceeds to a step S33, and a control value KMKTTW is set to 1.

Then, in a step S34, a coolant temperature increase basic value KTWTW for performing increase correction of the fuel injection amount Ti is obtained from a map. In order for this to be done, a map of the coolant temperature increase basic value KTWTW as determined in terms of the coolant temperature Tw is stored in advance in the control unit 6. In this map, the lower is the value of the coolant temperature Tw, the greater is the value which the coolant temperature increase basic value KTWTW assumes.

Further, a coolant temperature increase rotational speed correction value KTWN for correcting the coolant temperature increase basic value KTWTW according to the engine revolution speed N is obtained in the same manner from another map. In order for this to be done, a map of this coolant temperature increase rotational speed correction value KTWN as determined in terms of the engine revolution speed N is stored in advance in the control unit 6. In this map, the lower is the value of the engine revolution speed N, the greater is the value which the coolant temperature increase rotational speed correction value KTWN assumes.

And further, a coolant temperature decrease value MKTW for decrease correcting the fuel injection amount Ti according to the coolant temperature Tw is also obtained from another map. A map of this coolant temperature decrease value MKTW as determined in terms of the coolant temperature Tw is stored in advance in the control unit 6. This coolant temperature decrease value MKTW has a negative value, and in this map, the lower is the value of the coolant temperature Tw, the smaller is the absolute value which the coolant temperature decrease value MKTW assumes, i.e. the closer it is to zero.

In a step S35, the coolant temperature increase basic value KTWTW is multiplied by the coolant temperature increase rotational speed correction value KTWN, and thereby a coolant temperature increase value PKTW is obtained.

Next in a step S36 a decision is made from the output signal of the throttle opening sensor 17 or the like as to whether or not the engine 1 is in the idling operational state.

If the engine is in the non idling operational state, the flow of control proceeds to a step S38. Here, a load correction ratio which corresponds to the load on the engine, a revolution speed correction ratio which corresponds to the engine revolution speed, and a throttle opening amount correction ratio which corresponds to the throttle opening amount are all set. Since these corrections are all per se known, description thereof will be curtailed.

Next, in a step S39, the minimum one of the load correction ratio, the revolution speed correction ratio, and the throttle opening amount correction ratio is set as a correction ratio KMKT. The value of this correction ratio KMKT is between 0 and 1.

In a step S40, a decision is made as to whether or not the correction value KMKTW is less than the product of the correction ratio KMKT and the above described control value KMKTTW. Here, it is supposed that the correction value KMKTW has an initial value of 0.

In this case, since the control value KMKTTW was set to 1 in the step S33, if in the non idling operational state the correction ratio KMKT is 1, then KMKT×KMKTTW=1. Accordingly, the result of the decision in the step S40, until the correction value KMKTW becomes equal to 1, is YES, and the flow of control proceeds to a step S41.

In this step S41, the correction value KMKTW is increased by a predetermined increase amount ΔKMKTW. By doing this, it is increased by ΔKMKTW each time the process is executed until the correction value KMKTW arrives from 0 to KMKT×KMKTTW, If in the step S40 the correction value KMKTW has become equal to or greater than KMKT×KMKTTW, then the flow of control is transferred to a step S42. Here, the correction value KMKTW is set equal to KMKT×KMKTTW=1.

On the other hand, if in the step S36 it is determined that the engine 1 is in the idling operational state, then the flow of control is transferred to the step S37, and an idling correction ratio (which actually is 0) is set as the correction ratio KMKT.

In this case the result of the decision in the step S40 is always NO, and the flow of control is transferred to the step S42 in which the correction ratio KMKTW is set to 0.

With the above procedure, the engine cold state before the air/fuel ratio feedback control is started is separated into two states, to wit the idling operational state directly after starting and the state in which the idling state has been terminated, and, although in the former the correction value KMKTW is zero, in the latter state it is gradually increased until the correction ratio KMKT determined in the step S39 according to the engine load, the engine revolution speed, and the throttle opening amount is attained. FIG. 5G shows the behavior as, directly after the engine has been started, the correction value KMKTW transits from the former state to the latter state.

In a step S43, based upon the aforementioned coolant temperature increase value PKTW, the coolant temperature decrease value MKTW and the correction value KMKTW, the coolant temperature correction coefficient KTW is calculated according to the following equation:

$$KTW=PKTW-(PKTW-MKTW)\cdot KMKTW$$

According to this equation, even in the idling operational state, if the correction value KMKTW is 0, the coolant temperature increase value PKTW is selected to be the coolant temperature correction coefficient KTW, and the fuel injection amount is increase corrected according to the coolant temperature.

On the other hand, if it is the non idling operational state, if for example the correction value KMKTW is 1, the coolant temperature decrease value MKTW is selected rather than the coolant temperature increase value PKTW as the coolant temperature correction coefficient KTW, so that the fuel injection amount is decrease corrected according to the coolant temperature.

As shown in FIG. 5G, when the engine transits from the idling operational state to the non idling operational state, the correction value KMKTW is gradually increased from 0. Along with this, as shown in FIG. 5H, the increase correction amount of the coolant temperature correction coefficient KTW is gradually reduced from the increase correction state, and in practice, after increase correction ceases to be performed, decrease correction is performed with the decrease correction amount being gradually increased.

In other words, while in the idling operational state the stability of the engine operation in the cold engine state is assured due to increase of the fuel injection amount, on the other hand, when the engine transits to non idling operation, the oxygen concentration in the exhaust gas is increased due to the decrease correction of the fuel injection amount. Accordingly, as shown in FIGS. 6A through 6C, it immediately becomes possible to convert HC at the stage when the catalyst temperature reaches the activation temperature.

Figures 6A, 6B, 6C:
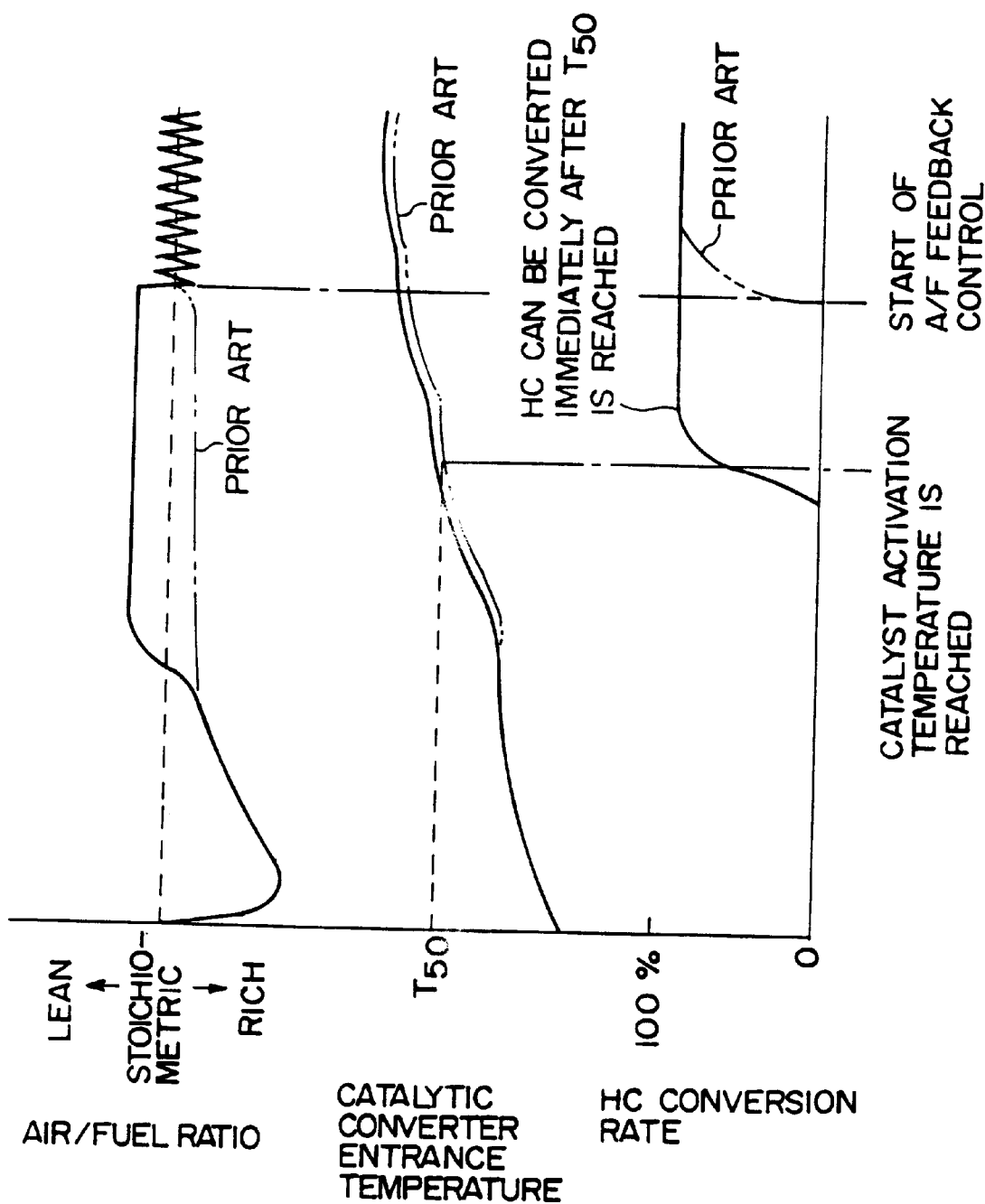
FIGS. 6A through 6C are timing charts for comparison of the results of control by the control apparatus with an example of the aforesaid prior art.

By contrast to this, in the engine cold state before the air/fuel ratio feedback control has been started, if the increase correction of the fuel injection amount is performed without any consideration of whether the engine is in the idling operational state or in the non idling operational state, then as shown by the chain lines in FIGS. 6A through 6C, the oxygen concentration in the exhaust gas is reduced due to the increase correction of the fuel injection amount, and it is not possible to convert HC even though the catalyst has reached its activation temperature.

Moreover, since the correction ratio KTW is set according to the engine load, the engine revolution speed, and the throttle opening amount, if for example a value less than 1 is set for the correction value KMKTW, even in the non idling operational state, the decrease correction of the fuel injection amount by the coolant temperature decrease value MKTW is restricted. Accordingly, deterioration of operability due to decrease correction of the fuel injection amount is avoided while the decrease correction range is set large.

In a step S44, a correction ratio ADVKTC is read in for advance angle correction of the ignition timing in the decrease correction state. Herein it will be supposed that this correction ratio ADVKTC is a constant value set in advance.

In a step S45, an ignition timing advance angle correction value ADVKTW is determined according to the following equation:

$$ADVTKW=(PKTW-MKTW)\cdot KMKTW-ADVKTC$$

According to this equation, the advance angle correction value ADVKTW is increased as the coolant temperature increase value PKTW for the fuel injection amount diminishes or the coolant temperature decrease value MKTW increases. Although the stability of the operation of the engine is deteriorated when the decrease ratio for the fuel injection amount becomes large, this is compensated for by improvement of the stability due to advance angle correction of the ignition timing. When the engine transits from the idling operational state to the non idling operational state, although the fuel injection amount gradually changes from increase correction to decrease correction, since the ignition timing advance angle correction value is gradually increased in correspondence therewith, the stability of the engine operation is maintained.

Further, if with the objective of heating up the catalyst the ignition timing is corrected by being retarded, advance angle correction is performed from the retardation corrected ignition timing, with the advance angle correction value ADVKTW.

Although it would also be possible to look up the advance angle correction value ADVKTW from a specially prepared map, it is possible to reduce the amount of data which must be stored in the memory by setting it according to the decrease ratio for the fuel injection amount, as described above.

If in the aforesaid step S32 it is found that air/fuel ratio feedback control is being performed, then in a step S46 the control value KMKTTW is reset to 0 and in a step S47 the coolant temperature correction coefficient KTW is reset to 0, and correction is not performed according to the coolant temperature correction coefficient KTW In a step S48 a decision is taken as to whether or not the ignition timing advance angle correction value ADVKTW is 0, and if it is not zero then this ignition timing advance angle correction value ADVKTW is returned to zero by being reduced each time by a predetermined value ΔADVKTW. Accordingly, even if air/fuel ratio feedback control is started from the decrease correction state, as shown in FIG. 5I, sudden change of the ignition timing is avoided, and accordingly the deterioration of operability of the engine which would accompany such sudden change of the ignition timing does not occur.

The embodiments of this invention in which an exclusive property or privilege is claimed are defined as follows:

1. A control apparatus for an engine, said engine having means for supplying an amount of fuel corresponding to a stoichiometric air/fuel ratio to said engine, and a catalytic converter for purifying exhaust gas of said engine, comprising:

means for detecting a temperature of said engine, means for determining from said temperature whether or not said engine is in a cold state, means for distinguishing whether said engine is in an idle operation state or in a non-idle operation state, means for applying a decrease correction to said fuel amount with respect to the stoichiometric air/fuel ratio, when said engine is in the non-idle operation state while said engine is in the cold state; and means for applying an increase correction to said fuel amount with respect to the stoichiometric air/fuel ratio, when said engine is in the idle operation state while said engine is in the cold state.

2. A control apparatus as defined in claim 1, wherein said means for applying a decrease correction and means for applying an increase correction correct said fuel amount based on a correction value KTW determined by the following relation:

$$KTW = PKTW - (PKTW - MKTW) \cdot KMKTW$$

where, PKTW is an increase value for increase correcting said fuel amount,

MKTW is a decrease value for decrease correcting said fuel amount and

KMKTW is a correction factor which is equal to 0 when said engine is in the idle operation state and is equal to a value larger than 0 and equal to or less than 1 when said engine is in the non-idle operation state.

3. A control apparatus as defined in claim 2, wherein said correction factor KMKTW is arranged to gradually change when a shifting occurs between the idle operation state and non-idle operation state.

4. A control apparatus as defined in claim 2, further comprising means for advancing an ignition timing in said engine when said means for applying a decrease correction is active, wherein said means for advancing increases an advance amount of the ignition timing as (PKTW−MKTW) increases.

5. A control apparatus for an engine, said engine having means for supplying an amount of fuel corresponding to a stoichiometric air/fuel ratio to said engine, and a catalytic converter for purifying exhaust gas of said engine, comprising:

means for detecting a temperature of said engine, means for determining from said temperature whether or not said engine is in a cold state, means for distinguishing whether said engine is in an idle operation state or in a non-idle operation state, means for applying a decrease correction to said fuel amount with respect to the stoichiometric air/fuel ratio, when said engine is in the non-idle operation state while said engine is in the cold state; and means for feedback controlling said air/fuel ratio in said engine to a target value, and means for preventing said feedback controlling means from performing feedback control of said air/fuel ratio when said engine is in the cold state.

6. A control apparatus for an engine, said engine having means for supplying an amount of fuel corresponding to a stoichiometric air/fuel ratio to said engine, and a catalytic converter for purifying exhaust gas of said engine, comprising:

means for detecting a temperature of said engine, means for determining from said temperature whether or not said engine is in a cold state, means for distinguishing whether said engine is in an idle operation state or in a non-idle operation state, and means for applying a decrease correction to said fuel amount with respect to the stoichiometric air/fuel ratio, when said engine is in the non-idle operation state while said engine is in the cold state, wherein a difference between said fuel amount corresponding to the stoichiometric air/fuel ratio and an amount decreased by said means for applying a decrease correction is larger the higher said temperature.

7. A control apparatus for an engine, said engine having means for supplying an amount of fuel corresponding to a stoichiometric air/fuel ratio to said engine, and a catalytic converter for purifying exhaust gas of said engine, comprising:

means for detecting a temperature of said engine, means for determining from said temperature whether or not said engine is in a cold state, means for distinguishing whether said engine is in an idle operation state or in a non-idle operation state, means for applying a decrease correction to said fuel amount with respect to the stoichiometric air/fuel ratio, when said engine is in the non-idle operation state while said engine is in the cold state; and means for detecting at least one of an engine load, an engine revolution speed, and a throttle opening amount, and a difference between said fuel amount corresponding to the stoichiometric air/fuel ratio and an amount decreased by said means for applying a decrease correction is determined based on at least one of said engine load, said engine revolution speed, and said throttle opening amount.

8. A control apparatus for an engine, said engine having means for supplying an amount of fuel corresponding to a stoichiometric air/fuel ratio to said engine, and a catalytic converter for purifying exhaust gas of said engine, comprising:

means for detecting a temperature of said engine, means for determining from said temperature whether or not said engine is in a cold state, means for distinguishing whether said engine is in an idle operation state or in a non-idle operation state, means for applying a decrease correction to said fuel amount with respect to the stoichiometric air/fuel ratio, when said engine is in the non-idle operation state while said engine is in the cold state; and means for advancing an ignition timing in said engine when said means for applying a decrease correction is active, wherein said means for advancing gradually increases an advance amount of the ignition timing from a time point at which said means for applying a decrease correction comes to be active, and gradually decreases the advance amount from a time point at which said means for applying a decrease correction comes to be inactive.

* * * * *